Nov. 3, 1936.    H. J. SCHLACKS    2,059,402
PICTURE PROJECTION SCREEN AND SUPPORTING FRAME THEREFOR
Filed March 7, 1935    2 Sheets-Sheet 1
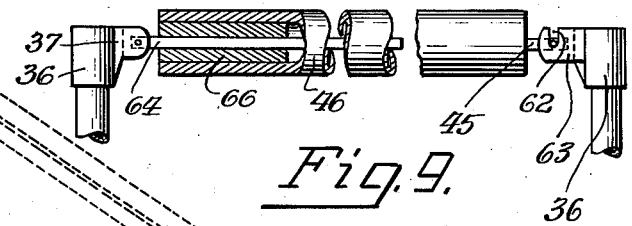
Fig. 9.
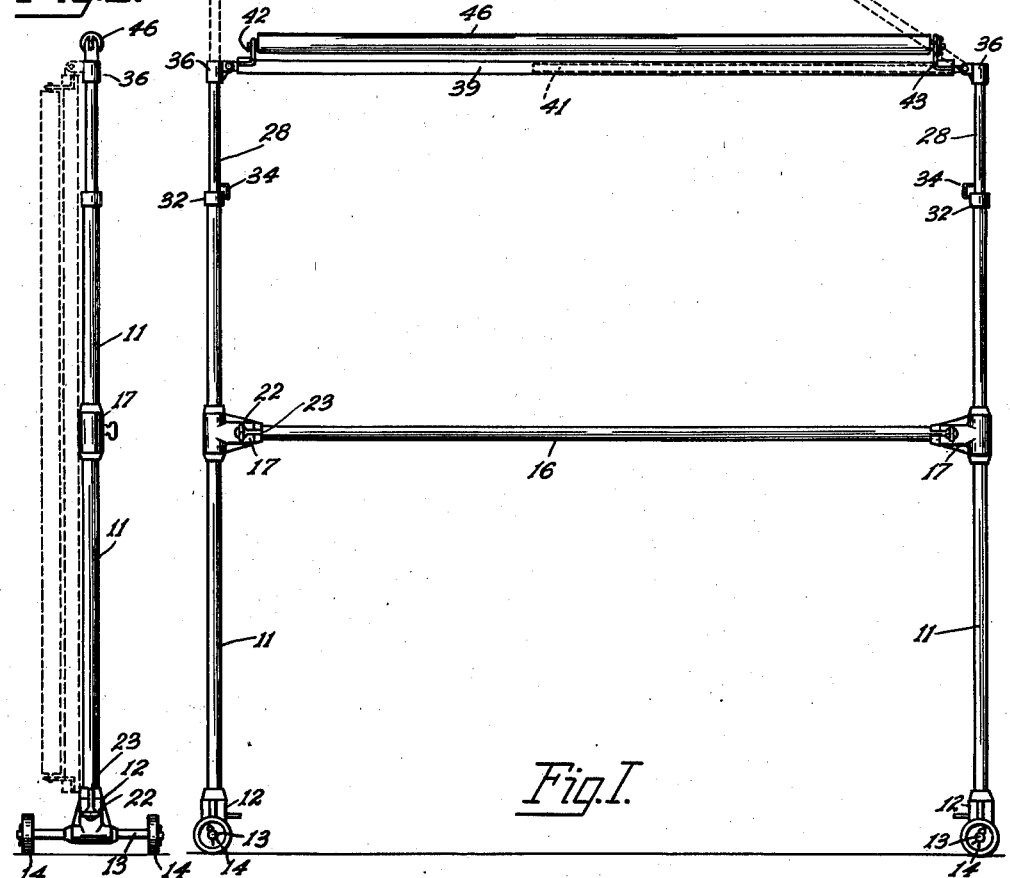
Fig. 2.
Fig. 1.
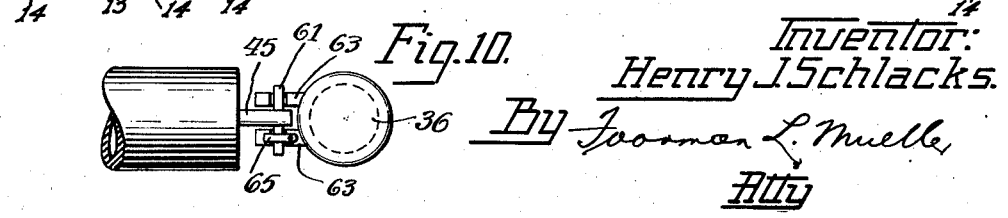
Fig. 10.
Inventor:
Henry J Schlacks.
By Foorman L Mueller
Atty

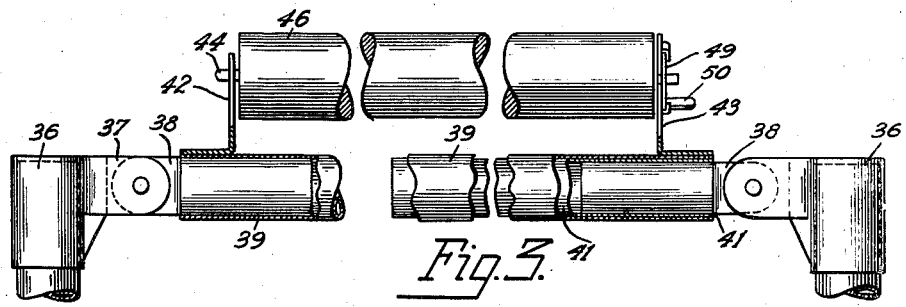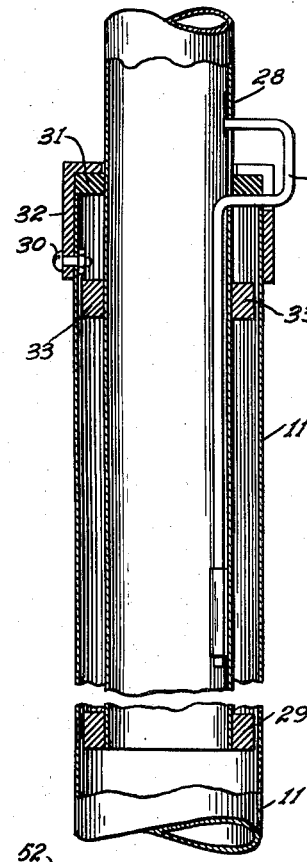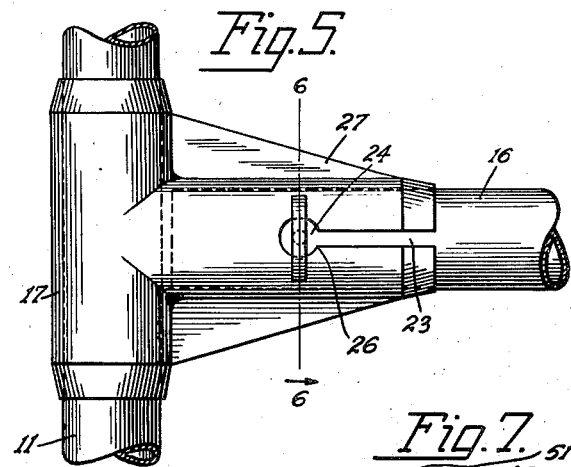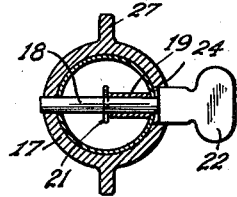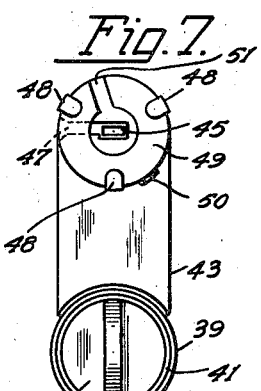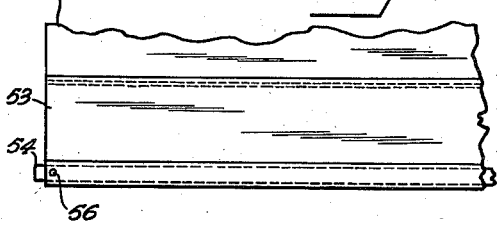

Patented Nov. 3, 1936

2,059,402

UNITED STATES PATENT OFFICE 2,059,402

PICTURE PROJECTION SCREEN AND SUPPORTING FRAME THEREFOR

Henry J. Schlacks, Chicago, Ill.

Application March 7, 1935, Serial No. 9,822

17 Claims. (Cl. 88—24)

My invention relates in general to a screen support, and in particular to an adjustable, collapsible and portable frame for supporting a screen upon which to project moving pictures, stereopticon slides and the like.

With the general use of moving picture projectors and stereopticon machines in schools, churches, and other public institutions, and in clubs and homes, there has been the problem of providing a screen which could be quickly set up in any type of room or architectural structure. There has also been the problem of setting up the screen so that the picture would be visible to the entire audience in an ordinary room, auditorium, or chapel, with its ornamentations and irregularly shaped room sections. This often necessitates raising the screen a considerable height above the floor. A still further problem existed in providing a mounting for the screen which could be moved about, stored in a small space, and would in itself be of such design as to be neat, comparatively inconspicuous, yet extremely sturdy. Furthermore, it has been necessary that these problems be overcome in a structure of original low cost and which is substantially free from upkeep.

The screens and supporting frames in use at the present time are in general complicated, clumsy and expensive. They do not have the adaptability necessary for use in all types of architecture, so that the operator is limited in the particular type of room or hall in which the screen may be set up.

It is an object of my invention to provide an improved supporting frame and screen for motion picture projection and the like.

A further object is to provide a supporting frame for a screen which may be set up in any type of room, and then be readily adjustable even by an inexperienced operator, to make the projected picture visible to the entire audience.

An additional object is to provide a spring roller on a frame which, though collapsible, includes positive, reliable means for preventing the roller from slipping from its brackets and becoming unwound.

It is also an object to provide a supporting frame and screen which is collapsible and portable, but which, when assembled, is adjustable so that it may be moved through relatively small doors and openings without taking the frame apart.

A still further object is the provision of a supporting frame and screen which is neat in appearance, sturdy, simple in construction, and low in cost.

Other objects and advantages will be apparent from the following description taken with the drawings, in which:

Fig. 1 is a front elevation of the assembled screen supporting frame, with the screen rolled up and carried on the frame.

Fig. 2 is a side elevation of Fig. 1.

Fig. 3 is a fragmentary front elevation.

Fig. 4 is a fragmentary vertical sectional view of one of the standards.

Fig. 5 is a fragmentary front elevation of a structural joint.

Fig. 6 is a section substantially through the line 6—6 of Fig. 5.

Fig. 7 is a side elevation showing the roller lock.

Fig. 8 is a fragmentary detail view of the bottom of the screen.

Figs. 9, 10 and 11 are respectively elevational, plan and sectional views of modifications of the invention.

Although this invention may take numerous forms, only one has been chosen for illustration. In this form the screen is supported by a pair of standards, each of which includes an upright 11, preferably removably secured in a socket 12 which is the upright leg of an inverted T-shaped casting, through the horizontal member of which extends a fixed axle 13. At the ends of the axle 13 may be either stationary feet or, more desirably, wheels 14 rotatably mounted thereon in any suitable manner. The axle 13 preferably extends forwardly and rearwardly from the screen so as to give the screen stability in the forward and rearward direction.

The two standards or uprights 11 are rigidly secured together by a cross bar 16 which is preferably removable from both of said standards, being removably secured in a socket formed by the horizontal leg of T-shaped castings 17 mounted on the standards 11. Of course a plurality of cross bars may be provided if desired, but this is not considered necessary.

The manner of coupling the cross bar 16 to the T-members 17 may be identical with the manner of joining the standards 11 to the socket or T-members 12, and this is shown in detail in Figs. 5 and 6. The cross bar 16 has extending therethrough a pin 18 which may be secured therein in a rotatable manner by any desired means, as for example by the sleeve 19 carried on the pin 18 and bearing against the inside of the cross bar 16. The sleeve 19 may be held at a given position on the pin 18 in any suitable manner, as by a cotter pin 21.

A key or head 22 is formed on one end of the pin 18 and may bear against the outside of the cross bar 16. This key 22 is of the flat shape shown best in Fig. 5. The casting 17 is provided with diametrically opposed slots 23, one of which is provided with an enlarged inner end 24 and may be called a key hole slot. As a cross bar is inserted into the casting 17 the pin 18 slides into one of the slots, and the key 22, turned to the horizontal position, slides into the other slot. When the cross bar 16 reaches the limit of its movement, the key 22 is turned to a vertical position as shown in Fig. 5, thereby locking the cross bar 16 firmly in place in the T-member 17.

It is preferred that the pin 18 have a snug fit with the inner end of the plain slot 23 and that its key 22 have a snug fit with the enlargement 24 of the key hole slot. This anchors the cross bar 16 firmly and rigidly to the casting 17, and in fact even prevents any rotation of the cross bar 16 about its axis. To facilitate turning the key into a snug fitting opening 24, the opening may be slightly enlarged at the corners 26, thus giving sort of a cam-like effect to the turning of the key 22. It may be noted that the casting 17 may be provided with webs 27 for strength and rigidity, and may be brazed or otherwise secured in place on the uprights 11. This may also be said of the other fixed fittings. Of course, if desired, each upright 11 may be formed in two pieces, both secured to the casting 17, and in that event it may be desirable to have them removably secured thereto as is the case of the cross bar 16.

Within the standard uprights 11 may be telescoped extension uprights 28. Leaning of the extension upright 28 with respect to the fixed upright 11, as they are relatively drawn out, may be prevented by provision of a bushing 29 fixed on the bottom of each extension upright 28 and a bushing 31 at the top of each fixed upright 11. The bushing 31 is preferably rubber or other soft material that will not scratch the extension upright 28, and it is held in place by a collar 32 as illustrated in Fig. 4. This collar may be held in place by a screw 30 which also acts as a stop and may be engaged by an additional bushing 33 on the extension 28. The extension upright 28 may be held in its upper position by means of a spring latch 34 preferably secured at its bottom to the inside of the extension upright 28 as illustrated in Fig. 4. The collar 32 and bushing 31 may be notched so that the spring latch 34 will lock the two uprights against vertical rotation as well as collapsing.

Secured at the top of each extension upright 28 is a casting 36 forming a cap and having a hinge arm 37 preferably bifurcated. Pivoted on each hinge 37 is a stub shaft 38. One of these stub shafts extends into and is rigidly secured to a tube 39, and the other extends into and is rigidly secured to a tube 41 which is of such size as to telescope easily but snugly within the tube 39. To the outer tube 39 are secured, as by welding, two roller shade brackets 42 and 43. The bracket 42 has a simple pivot hole therethrough, through which the round pin 44 of a spring roller 46 may be inserted. The bracket 43 is preferably provided with a slot 47 suitable for engaging the usual key 45 of a spring roller such as is commonly used for shades or screens.

Also formed on the bracket 43 are three lugs 48 which are preferably turned outwardly and flanged radially inwardly as shown best in Figs. 3 and 7. Carried by these lugs and between their flanges and the upright portion of the bracket 43 is a disc 49 provided with a handle 50 and radial slot 51. This disc is rotatable within the lugs 48 and therefore may be rotated to a position in which its slot 51 is alined with the slot 47 of the bracket 43 and, when the key has been inserted within said slots, the ring 49 may be rotated to a different position such as that shown in Fig. 7 in which the key 45 is locked in place.

The slot 47 may be either vertical or horizontal, the vertical position having the advantage that the roller is less likely to come out even if the disc 49 happens to be turned to a position releasing the key 45, and the horizontal position having the advantage that if an ordinary roller with the usual latches is used, the latches will not engage when the key is in this position. This will permit the screen to be kept under tension when the lower end of the screen is secured.

The screen itself may comprise any suitable flexible material 52, and as shown in Fig. 8 may have secured at the bottom thereof a strip 53 of a different and preferably heavier material such as a light grade of canvas. This strip is preferably long enough from top to bottom to wrap entirely around the rolled-up screen so as to protect the same. A bar 54, such as the usual shade stick, may be provided in a suitable hem either in the strip 53 as shown, or in the screen proper 52. Also, suitable holes 56 may be provided along the bottom edge of the screen, or at least at the bottom corners, through which may be secured suitable tie-down tabs. Of course, if preferred, any other suitable means may be provided for holding taut the lower edge of the screen against the tension of the roller.

The construction heretofore described makes the raising and lowering of the roller 46 extremely easy, positively preventing jamming. It should be realized that a screen of this type will usually be too large for both extension uprights to be raised uniformly. Often the screen will be drawn through a door to its position of use and raised in full view in the midst of a program or service, when any awkwardness such as that resulting from jamming would be very distracting and disconcerting. It is possible to raise each of the extension uprights 28 separately from its lower position all the way to its upper position without any binding, as is clearly shown in Fig. 1. The jamming is prevented by the telescoping of the tubes 39 and 41 and by their being hinged to the castings 37, so that there is nothing to draw the extension uprights out of alinement. Thus, as the first upright is moved from its lower to its upper position as shown in Fig. 1, binding is prevented by the elongation of the telescoped tubes 39 and 41. As the second upright is raised, these tubes simply telescope back to their original length. This easy raising and lowering is not only advantageous at the initial assembly of the screen and under the special circumstances mentioned, but also whenever it is necessary to lower the screen for any reason as to move it through a doorway. To do this it is merely necessary to separately press each of the latches 34 and separately lower the extension uprights associated therewith. The entire screen assembly may then be rolled through any ordinary doorway.

It should be noticed that the non-jamming feature makes the use of rubber in the bushings 31 entirely practical since strong side-pull on the extension uprights is prevented.

A modification of the non-jamming feature is illustrated in Figs. 9 and 10, in which the upper cross bar is dispensed with. In this form the key end of the roller 46 is supported in a vertically pivotal manner as by a pin 61 passed through the key 45 and resting in slots 62 in spaced brackets 63 on cap 36. The other end is supported by a rod or tube 64 telescoping within roller 46 and pivoted to the bifurcated bracket 37 on the other cap 36. To prevent objectionable play between rod 64 and roller 46, an elongated bushing 66 may be provided in the roller 46 as illustrated, which may slide and rotate easily on the rod 64. A locking arm 65 is pivoted on the bracket 63 to lock the pin 61 in position. A similar arm may be pivoted on the other bracket if desired.

Fig. 11, which is a section corresponding to Fig. 6, is an illustration of a modified form of the lock shown in Fig. 6. A plug 71 is fitted in the cross bar 16 and carries the locking pin. The locking pin includes a stem 72 small enough to slide in slot 23 (see Fig. 5) and a head 73 of a size to fit snugly in the hole 24 at the inner end of slot 23. The head may be enlarged to form a handle 74. At the inner end of stem 72 is carried a screw 76 on which is carried a spring 77 as shown for urging the pin to locking position.

The construction disclosed also makes possible the packing or storing of the screen assembly in a small place and its ready assembly when used. To disassemble the screen it is merely necessary to turn the various keys 22 to the releasing positions (longitudinal of the slots) and then draw the parts away from one another. First the right hand uprights shown in Fig. 1 may be drawn away from the rest of the structure. This separates the said uprights from the cross bar 16 and also separates the tube 41 from the outer tube 39. The cross bar 16 may then be drawn out of its socket 17 and thereby separated from the other uprights. The tube 39 may then be swung around to a position where it will not strike the socket portion of the casting 17, and then dropped alongside of the uprights as shown in dotted lines in Fig. 2. The uprights may then be removed from the casting or sockets 12.

The long members are then all free from any large protuberances and may be laid side by side. In reassembling the screen the process is of course simply reversed.

Although I have described my invention in its preferred embodiments, it is to be understood that I am not limited thereby, but limit my invention only by the scope of the appended claims.

I claim:

1. The combination of a picture projection screen and a standard for said screen including a pair of standard uprights, means for rigidly spacing said uprights apart, and a pair of extension uprights each telescoped with respect to one of said standard uprights, and screen-carrying means extending between the tops of said extension uprights comprising a tubular member vertically hinged to one of said extension uprights, and a core member slidably telescoped within said tubular member and vertically hinged to the second extension upright.

2. The combination of a picture projection screen and a standard for said screen including a pair of standard uprights and a pair of extension uprights each telescoped within one of said first named standard uprights, a cross bar rigidly but detachably secured to each of said uprights, and screen-carrying means extending between the tops of said extension uprights comprising a tubular member vertically pivoted to one of said extension uprights, a core member slidably telescoped within said tubular member and vertically hinged to the second extension upright.

3. A standard suitable for supporting a picture projection screen comprising a pair of standard uprights each rigidly but detachably secured to a cross bar by means of a pin extending from one of said members in a fixed position with respect thereto and extending through slots in the other of the joined members, and a pair of extension uprights each telescoped with respect to one of said standard uprights, and a second cross bar vertically hinged to the top of one of said extension uprights about a pivot point offset from said upright and detachably secured to the top of the other of said extension uprights, whereby it may fold to a position parallel with the first specified extension upright.

4. A standard suitable for supporting a picture projection screen comprising a pair of standard uprights each rigidly but detachably secured to a cross bar by means of a pin extending from one of said members in a fixed position with respect thereto and extending through diametrically opposed slots in the other of the joined members, and a pair of extension uprights each telescoped with respect to one of said standard uprights, and a second cross bar vertically hinged to the top of one of said extension uprights about a pivot point offset from said upright and detachably secured to the top of the other of said extension uprights, whereby it may fold to a position parallel with the first specified extension upright.

5. A standard suitable for supporting a picture projection screen comprising a pair of standard uprights each rigidly but detachably secured to a cross bar, and a pair of extension uprights each telescoped with respect to one of said standard uprights, and a second cross bar vertically hinged to the top of one of said extension uprights about a pivot point offset from said upright and detachably secured to the top of the other of said extension uprights, whereby it may fold to a position parallel with the first specified extension upright.

6. A standard suitable for supporting a picture projection screen comprising a pair of standard uprights each rigidly but detachably secured to a cross bar, a pair of extension uprights each telescoped with respect to one of said standard uprights, and a second cross bar vertically hinged to the top of one of said extension uprights about a pivot point offset from said upright and detachably secured to the top of the other of said extension uprights by means of telescoping over a core which is vertically hinged to the top of said other extension upright.

7. A standard suitable for supporting a picture projection screen comprising a pair of standard uprights each rigidly but detachably secured to a cross bar, a pair of extension uprights each telescoped with respect to one of said standard uprights, a second cross bar vertically hinged to the top of one of said extension uprights about a pivot point offset from said upright and detachably secured to the top of the other of said extension uprights, whereby it may fold to a position parallel with the first specified extension upright, and forwardly and rearwardly extending foot members rigidly but detachably secured to the base of each of said standard uprights.

8. A standard suitable for supporting a picture projection screen comprising a pair of standard uprights each rigidly but detachably secured to a cross bar, a pair of extension uprights each telescoped with respect to one of said standard uprights, a second cross bar vertically hinged to the top of one of said extension uprights about a pivot point offset from said upright and detachably secured to the top of the other of said extension uprights, whereby it may fold to a position parallel with the first specified extension upright, and forwardly and rearwardly extending foot members rigidly but detachably secured to the base of each of said standard uprights, each of said foot members being supported on rollers.

9. A collapsible frame including two members, and means for detachably joining said members comprising a socket secured to one of said members and having formed therein diametrically opposed slots, and a pin extending through said other member and rotatable therein but otherwise fixed with respect thereto, a head at one end of said pin longer transversely of said pin than the width of the slot and of a lesser thickness in the other transverse direction which permits its sliding in one of said slots when longitudinally positioned therein, and said slot having its inner end enlarged to such a size as to snugly engage the head of said pin when it is turned transversely to said slot, the other end of said pin being of a thickness to snugly engage the other of said slots.

10. A collapsible frame including two members, means for detachably joining said members comprising a socket secured to one of said members and having formed therein a slot, a pin extending through said other member and rotatable therein but otherwise fixed with respect thereto, a head at one end of said pin longer transversely of said pin than the width of the slot and of a lesser thickness in the other transverse direction which permits its sliding in said slot when longitudinally positioned therein, and said slot having its inner end enlarged to such a size as to snugly engage the head of said pin when it is turned transversely to said slot.

11. A standard suitable for supporting a picture projection screen comprising a pair of standard uprights each rigidly but detachably secured to a cross bar, and a pair of extension uprights each telescoped within one of said standard uprights; said extension uprights being enough smaller than said standard uprights to be surrounded therewithin by an annular space; a bushing secured to the top of each of said standard uprights and spacing the extension uprights therefrom, said bushing being made of a relatively soft material to prevent marring of said upright, a cap over said bushing having a hole therethrough slightly larger than said extension upright, and a second cross bar expandably constructed and vertically hinged to the top of each of said extension uprights.

12. A standard suitable for supporting a picture projection screen comprising a pair of standard uprights each rigidly but detachably secured to a cross bar, and a pair of extension uprights each telescoped within one of said standard uprights; said extension uprights being enough smaller than said standard uprights to be surrounded therewithin by an annular space; a bushing secured to the top of each of said standard uprights and spacing the extension uprights therefrom, said bushing being made of rubber to prevent marring of said upright, and a second cross bar expandably constructed and vertically hinged to the top of each of said extension uprights.

13. A standard suitable for supporting a picture projection screen comprising a pair of standard uprights each rigidly but detachably secured to a cross bar, and a pair of extension uprights each telescoped within one of said standard uprights; said extension uprights being enough smaller than said standard uprights to be surrounded therewithin by an annular space; a bushing secured to the top of each of said standard uprights and spacing the extension uprights therefrom, said bushing being made of a relatively soft material to prevent marring of said upright, and a second cross bar expandably constructed and vertically hinged to the top of each of said extension uprights.

14. The combination of a picture projection screen and a standard for said screen including a pair of standard uprights and a pair of extension uprights each telescoped within one of said first named standard uprights, a cap secured on each extension upright having a lateral projection formed thereon, a cross bar rigidly but detachably secured to each of said standard uprights, and screen-carrying means extending between the tops of said extension uprights comprising a tubular member vertically pivoted to one of said projections, a core member slidably telescoped within said tubular member and vertically hinged to the second projection.

15. The combination of a picture projection screen and a standard for said screen including a pair of standard uprights and a pair of extension uprights each telescoped within one of said first named standard uprights, a cap secured on each extension upright having a lateral projection formed thereon, a cross bar rigidly secured to each of said standard uprights, and screen-carrying means extending between the tops of said extension uprights comprising a tubular member supported by and vertically pivotable with respect to one of said projections, a core member slidably telescoped within said tubular member and supported by and vertically pivotable with respect to the second projection.

16. The combination of a picture projection screen and a standard for said screen including a pair of standard uprights and a pair of extension uprights each telescoped within one of said first named standard uprights, a cross bar rigidly secured to each of said standard uprights, and screen-carrying means extending between the tops of said extension uprights comprising a tubular member supported by and vertically pivotable with respect to one of said extension uprights, a core member slidably telescoped within said tubular member and supported by and vertically pivotal with respect to the second extension upright.

17. The combination of a picture projection screen and a standard for said screen including a pair of standard uprights and a pair of extension uprights each telescoped within one of said first named standard uprights, a cross bar rigidly secured to each of said standard uprights, and screen-carrying means extending between the tops of said extension uprights comprising a spring actuated roller supported by and vertically pivotable with respect to one of said extension uprights, a core member slidably telescoped within said spring actuated roller and supported by and vertically pivotal with respect to the second extension upright.

HENRY J. SCHLACKS.